United States Patent
Persson

(10) Patent No.: US 9,982,800 B2
(45) Date of Patent: May 29, 2018

(54) BENDING RESTRICTOR ASSEMBLY FOR PERMANENTLY BENDING AND RESTRAINING OVALITY OF A SUBSEA PIPE

(71) Applicant: Tor Persson, Houston, TX (US)

(72) Inventor: Tor Persson, Houston, TX (US)

(*) Notice: Subject to any disclaimer, the term of this patent is extended or adjusted under 35 U.S.C. 154(b) by 0 days. days.

(21) Appl. No.: 15/672,815

(22) Filed: Aug. 9, 2017

(65) Prior Publication Data

US 2018/0010712 A1    Jan. 11, 2018

Related U.S. Application Data

(63) Continuation-in-part of application No. 14/824,630, filed on Aug. 12, 2015, now Pat. No. 9,822,918.

(51) Int. Cl.

| | |
|---|---|
| *F16L 11/00* | (2006.01) |
| *F16L 1/12* | (2006.01) |
| *F16L 57/02* | (2006.01) |
| *F16L 1/20* | (2006.01) |
| *F16L 1/16* | (2006.01) |

(52) U.S. Cl.
CPC .............. *F16L 1/123* (2013.01); *F16L 1/20* (2013.01); *F16L 57/02* (2013.01); *F16L 1/16* (2013.01)

(58) Field of Classification Search
CPC ...................................................... F16L 1/123
USPC ......................................... 138/110, 119, 120
See application file for complete search history.

(56) References Cited

U.S. PATENT DOCUMENTS

| | | | | |
|---|---|---|---|---|
| 3,060,972 A * | 10/1962 | Sheldon | .............. | A61B 1/0055 |
| | | | | 138/120 |
| 3,908,703 A * | 9/1975 | Bournazel | .............. | F16L 11/08 |
| | | | | 138/120 |
| 1,677,077 A | 7/1982 | Fortune | | |
| 4,396,797 A * | 8/1983 | Sakuragi | ................. | F16L 11/18 |
| | | | | 138/110 |
| 5,192,166 A | 3/1993 | Persson | | |
| 5,215,338 A * | 6/1993 | Kimura | .................... | F16L 3/015 |
| | | | | 138/120 |
| 5,403,121 A | 4/1995 | Lanan | | |
| 8,047,236 B2 * | 11/2011 | Perry | .................... | A61B 1/0055 |
| | | | | 135/155 |
| 8,562,255 B2 | 10/2013 | Persson | | |
| 8,869,840 B2 * | 10/2014 | Lund | ..................... | E21B 17/017 |
| | | | | 138/109 |
| 9,822,918 B2 * | 11/2017 | Persson | .................... | F16L 57/02 |
| 2009/0308478 A1 * | 12/2009 | Vo | ............................ | F16L 11/08 |
| | | | | 138/109 |
| 2010/0329792 A1 | 12/2010 | Persson | | |
| 2012/0048415 A1 * | 3/2012 | Espinasse | .............. | F16L 1/123 |
| | | | | 138/110 |

\* cited by examiner

*Primary Examiner* — James Hook
(74) *Attorney, Agent, or Firm* — Egbert Law Offices, PLLC

(57) ABSTRACT

A bending restrictor assembly has a pipeline section, a first overlying pipe section having a wall overlying a portion of the pipeline section at one end thereof, a second overlying pipe section having a wall overlying another portion of the pipeline section at an opposite end thereof, and a plurality of cylindrical members overlying the pipeline section between the first and second overlying pipe sections. The first and second overlying pipe sections extend outwardly beyond the respective ends of the pipeline section. The bending restrictor assembly achieves a permanent bend and restricts ovality of a subsea pipe.

18 Claims, 5 Drawing Sheets

BENDING RESTRICTOR ASSEMBLY FOR PERMANENTLY BENDING AND RESTRAINING OVALITY OF A SUBSEA PIPE

CROSS-REFERENCE TO RELATED APPLICATIONS

The present application is a continuation-in-part of U.S. patent application Ser. No. 14/824,630, filed on Aug. 12, 2105, and entitled "Bending Restrictor Assembly for a Pipeline", presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to apparatus for controlling the bending of a pipeline. In particular, the present invention is a bending restrictor assembly that serves to limit the cold bending of a pipeline. The present invention also relates to bending restrictor assemblies that allow a section of the pipeline to be bent beyond its elastic limit so as to achieve a permanent bend.

2. Description of Related Art Including Information Disclosed Under 37 CFR 1.97 and 37 CFR 1.98

Subsea pipelines are typically assembled one segment at a time aboard a pipeline-laying vessel. As each segment is added, the vessel moves forward and the pipeline follows a descending path to the sea floor. The suspended pipe span between the vessel stern and the sea floor is typically supported partly by a ramp attached to the vessel and axial tension is applied to the pipe which maintains the pipeline steel within elastic boundaries until reaching on the seabed.

The steel pipelines that are laid on the bottom of the sea cannot be pre-formed or pre-adapted to the contour of the sea floor. This is because of the above-identified laying and installation procedure.

There may be tolerated a certain degree of unevenness over which the pipeline is capable of spanning or bending, provided that the specific load does not produce excessively high stresses in the pipeline steel or cause vortex-induced vibrations. If stresses exceed allowable limits, the pipeline could be deformed permanently, either by buckling or cold bending, or both to an unacceptable configuration. Should cold bending occur through yielding of the steel in the pipeline, it could propagate uncontrollably. Requirements set by classification societies for construction and operation of offshore pipelines permit a certain degree of cold bending beyond elastic limits provided that it takes place under controlled conditions. Parameters for such controlled conditions entail that a pipeline may be cold bent to a minimum radius less than what is allowed for uncontrolled bending.

Pipelines that are laid on an uneven sea floor are subjected to free spanning because of the rigidity of the pipeline. Specifications used for submarine pipeline installation permits plastic deformation as long as positive measures are taken to ensure that excessive bending is prevented. By allowing plastic deformation, it is possible to reduce to a considerable degree the occurrence of free spanning Bending beyond elastic limits may be achieved by overloading the pipeline by applying external loads.

Submarine pipelines having a diameter of more than twelve inches usually require a weight coating to achieve negative buoyancy. This is necessary if the pipeline is to be submerged and also maintain a stable state with respect to the sea current. Plastic deformation of a pipeline having a weight coating of concrete will cause the concrete to crack and break loose.

Pipelines are often deployed at significant depths within the subsea environment. As such, these pipelines are subjected to an incredible amount of hydrostatic pressure. This hydrostatic pressure will tend to deform the pipeline causing collapse. This is particularly the case when attempts are made to bend the pipeline at the subsea location. Ultimately, because of the hydrostatic pressures and the forces of bending, the subsea pipeline will start to ovalize. This is a significant problem since the ovalization of the pipeline can prevent the desired flow of fluids through the pipeline and can prevent apparatus, such as cleaning pigs, from moving freely through the interior of the pipeline. In certain circumstances, the hydrostatic pressure, coupled with the bending of the pipeline, can actually cause a collapse of the pipeline.

The hydrostatic pressures and the ovalization problems could be limited to a certain degree in the subsea pipeline by making the area of the bent section of pipeline of a larger wall thickness. However, such a larger wall thickness would tend to prevent or hamper proper bending of this pipeline section and cause efforts to bend the pipeline in a desired direction to become much more difficult. As such, a need has developed so as to form a bendable pipeline section in which the pipeline section can be bent beyond its elastic limit so as to achieve a permanent bend while, at the same time, enhancing the resistance to ovalization and, resisting the hydrostatic pressure, and limiting the amount of the ovalization.

In the past, various patents and publications have issued relating to the controlling of the bending of a pipeline. For example, U.S. Pat. No. 5,192,166, issued to the present inventor, describes a method for controlled bending of a pipeline during the laying thereof in the sea. This method utilizes bend controlling/stopping means which are mounted on the pipeline and interact with the pipeline. To achieve cold bending under controlled conditions, the pipeline is weight-loaded internally at the selected bending zone. The weight-loading may be achieved by means of a flexible string of weight elements and/or by introducing into the pipe a suitable heavy, readily flowable weight mass, for example, drilling fluid or water.

U.S. Pat. No. 5,403,121, issued on Apr. 4, 1995 to Lanan, describes a method for accommodating thermal expansion of a buried subsea pipeline. This method includes the steps of providing a pipeline which bends in alternating essentially opposed directions. The angles of the bends and the distance between the bends are sufficiently small so that the pipeline is not plastically deformed when resting on the seabed. The number and angles of the bends are sufficiently large to prevent upheaval buckling. The bend angles and distance between the bends is small enough that the pipeline can be passed through a tensioning machine and ramp of a pipeline-laying vessel. The pipeline can then be installed on the sea floor.

U.S. Pat. No. 1,677,077, issued on Jul. 10, 1928 to D. D. Fortune, describes a hose protector in which a flexible sheath is connected to a collar. The sheath comprises a plurality of sections pivotally connected together. Each section is formed of a plurality of rings. Straps connect the rings together. An end of each strap projects beyond a ring and is pivotally connected to a ring of an adjacent section. The collars form a plurality of section pivotally connected together. This method is applicable for preventing kinking of a flexible hose and not exceeding allowable plastic deformation values.

U.S. Patent Publication No. 2010/0329792, published on Dec. 30, 2010 to the present inventor, describes a controlled bending of a pipeline by an external force. A bending collar assembly is attached to a selected bending zone of the pipeline so as to limit the control bending of the pipeline to a predetermined resulting bending configuration. External force is then applied on the bending collar assembly so as to bend the pipeline to the resulting bending configuration in cooperation with the bending collar assembly and the sea floor. The external force can be exerted from one or more weights placed on top of the bending collar assembly.

U.S. Pat. No. 8,562,255, issued Oct. 22, 2013 to the present inventor, describes a bending restrictor assembly for use with a pipeline section. The bending restrictor assembly has a sleeve affixed to the pipeline section, an outer collar slidably positioned relative to an over the sleeve, and it inner collar slidably positioned relative to an interior of the outer collar. The inner collar is in spaced longitudinal relation to an end of the sleeve. The inner and outer collars are slidable relative to a bending of the pipeline section. A series of holes and keyways are formed in the inner and outer collars. Pins are inserted into corresponding holes and keyways so as to correspond to a limit of the bending radius of the pipeline section.

FIG. 1 is an illustration of the prior art for the bending of the pipeline section. In particular, the illustration of FIG. 1 is from U.S. Pat. No. 8,562,255 of the present inventor. FIG. 1 shows the installation of the pipeline 1 generally in accordance with the teachings of the present invention. Pipeline 1 has bending restrictor assemblies 2 and 4 affixed thereto. The pipeline 1 is placed upon the sea floor 6 in a conventional manner. The pipeline 1 will hang at a desirable angle from the ramp of a pipe-laying vessel 8. Another vessel can be utilized so as to extend a weighted member 10 downwardly from a line 12. This weighted member 10 can be placed upon the pipeline 1 in the area of the bending restrictor assemblies 2 and 4. As such, the pipeline 1 can be bent at a desired angle relative to the seafloor 6. Additional weighted members 7 can be used separately from the weighted member 10. The weighted member can also be lowered from the vessel 8. The weighted member acts as a counterweight to facilitate the bending of the pipeline at the intended locations.

FIG. 1 shows that the bending restrictor assemblies 2 and 4 will allow the pipeline 1 to be bent at a suitable contour corresponding to the contour 14 of the seafloor 6. The bending restrictor assemblies 2 and 4 allow the pipeline 1 to be easily bent while controlling the amount of the bend and allowing the pipeline to achieve a bend beyond the elastic deformation limits and to achieve a permanent bend. As such, the pipeline 1 will conform to the contours 14 of the seafloor 6 without buckling and will reduce free spans. The other weighted member 7 can also be utilized so as to control the bending action of the pipeline 1 in combination with the bending restrictor assemblies.

Relative to FIG. 1, the bending of a pipeline or a pipeline section can be used in a large variety of ways in the subsea environment. The pipeline may need to be bent around obstacles or in order to be directed to intended targets.

It is an object of the present invention to provide a bending restrictor assembly that allows cold bending of the pipeline to be achieved at the seabed during pipeline installation operations.

It is another object the present invention provide a bending restrictor assembly which allows for the pipeline to bend beyond the elastic limit of the pipeline.

It is another object the present invention to provide a bending restrictor assembly that effectively limits the amount of the bend of the pipeline.

It is another object of the present invention to provide a bending restrictor assembly that avoids the ovalization in the area of the bend.

It is another object of the present invention to provide a bending restrictor assembly that resists the effect from hydrostatic pressures.

It is another object the present invention to provide a bending restrictor assembly that enhances the strength of the pipeline section at the ends of the bent pipeline section.

It is another object of the present invention to provide a bending restrictor assembly that avoids the collapse of the pipeline.

It is another object of the present invention provide a bending restrictor assembly which allows a pipe with a greater wall thickness to be joined to the bent pipeline section.

It is still another object of the present invention to provide a bending restrictor assembly that achieves a predetermined bend radius.

It is another object of the present invention to provide a bending restrictor assembly that can reduce the pipeline length and reduce costs.

It is an object of the present invention to provide a bending restrictor assembly that allows cold bending to be achieved at the seabed during pipeline installation operations.

It is another object the present invention to provide a bending restrictor assembly which allows for a pipeline to bend within predetermined limits.

It is another object of the present invention to provide a bending restrictor assembly which, when applied, can alleviate seabed preparation and post-installation corrections.

It is another object of the present invention to provide a bending restrictor assembly which can be installed on the pipeline section before being added to the pipeline as part of a final installation.

It is another object of the present invention to provide a bending restrictor assembly which can result in significant cost savings.

It is still further object of the present invention to provide a bending restrictor assembly which provides for the easy installation of smooth transition areas between the pipeline and the bending restrictor assembly.

It is still another object of the present invention provide a bending restrictor assembly which enhances the strength of the pipeline in the area of the transition between the pipeline of the bending restrictor assembly.

These and other objects and advantages of the present invention will become apparent from a reading of the attached specification and appended claims.

BRIEF SUMMARY OF THE INVENTION

The present invention is a bending restrictor assembly that comprises a pipeline section having an outer diameter, a first overlying pipe section having a wall overlying a portion of the pipeline section at a first end thereof, a second overlying pipe section having a wall overlaying another portion of the pipeline section at an opposite end thereof, and a plurality of cylindrical members overlying the pipeline section between the first and second overlying pipe sections. Each of the first and second overlying pipe sections has an outer diameter greater than the outer diameter of the pipeline section.

The first overlying pipe section has an end extending outwardly beyond one end of the pipeline section. The second overlying pipe section has an end extending outwardly beyond the second end of the pipeline section. The first overlying pipe section has a wall thickness beyond the first end of the pipeline section that is greater than a wall thickness of the wall that overlies the portion of the pipeline section. The second overlying pipe section has a wall thickness beyond the second end of the pipeline section that is greater than a wall thickness of the wall that overlies the another portion of the pipeline section. Each of the first and second overlying pipe sections has an outer diameter that generally matches the outer diameter of the plurality of cylindrical members.

The first overlying pipe section has an abutment surface positioned over the pipeline section. Similarly, the second overlying pipe section has another abutment surface over the pipeline section. The plurality of cylindrical members are positioned between the abutment surfaces. The first overlying pipe section has a flange extending radially outwardly therefrom adjacent the abutment surface thereof. The second overlying pipe section has another flange extending radially outwardly therefrom adjacent the another abutment surface. The plurality of cylindrical members include a first cylindrical member adjacent to the abutment surface of the first overlying pipe section and a second cylindrical member adjacent the abutment surface of the second overlying pipe section. The first cylindrical member has a flange at an end thereof adjacent the flange of the first overlying pipe section. The second cylindrical member has another flange at an end thereof adjacent the flange of the second overlying pipe section. The flange of the first cylindrical member is joined to the flange of the first overlying pipe section with a first tension member. The flange of the second cylindrical member is joined to the flange of the second overlying pipe section with a second tension member. Each of the tension members limits an amount of separation between the cylindrical members and the overlying pipe sections.

The first overlying pipe section and the second overlying pipe section can be shrink-fit onto the pipeline section such that an inner wall of the overlying pipe sections bears against the outer diameter of the pipeline section. Alternatively, the overlying pipe sections can be fitted in liquid-tight relation with the pipeline section. In other words, the inner diameter of the overlying pipe sections may be slightly greater than the outer diameter of the pipeline section. In such a circumstance, a seam weld is used so as to achieve this liquid-tightness.

The plurality of cylindrical members have a space therebetween when the pipeline section is straight. The plurality of cylindrical members have a portion abutting each other when the pipeline section is bent. The plurality of cylindrical members can have a tension member between adjacent cylindrical members. The tension member limits an amount of space between the adjacent cylindrical members when the pipeline section is bent. Each cylindrical member of the plurality of cylindrical members has a first flange at one end of the second flange at an opposite end. The tension member is affixed to these flanges.

In the present invention, each of the first and second overlying pipe sections has a maximum wall thickness that is greater than a wall thickness of the wall of the pipeline section. A first pipeline can be affixed to an end of the first overlying pipe section that extends outwardly of the pipeline section. A second pipeline is affixed to an end of the second overlying pipe section that extends outwardly of the pipeline section. The first pipeline has a wall thickness that matches a wall thickness of the first overlying pipe section at the end of the first overlying pipe section outwardly of the pipeline section. Similarly, the second pipe line has a wall thickness matching a wall thickness of the second overlying pipe section at an end of the second overlying pipe section outwardly of the pipeline section. The plurality of cylindrical members are a translatable along the pipeline section as the pipeline section is bent. The plurality of cylindrical members allow the pipeline section to bend beyond an elastic limit of the pipeline section so as to achieve a permanent bend of the pipeline section.

This foregoing Section is intended to describe, with particularity, the preferred embodiments of the present invention. It is understood that modifications to these preferred embodiments can be made within the scope of the appended claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
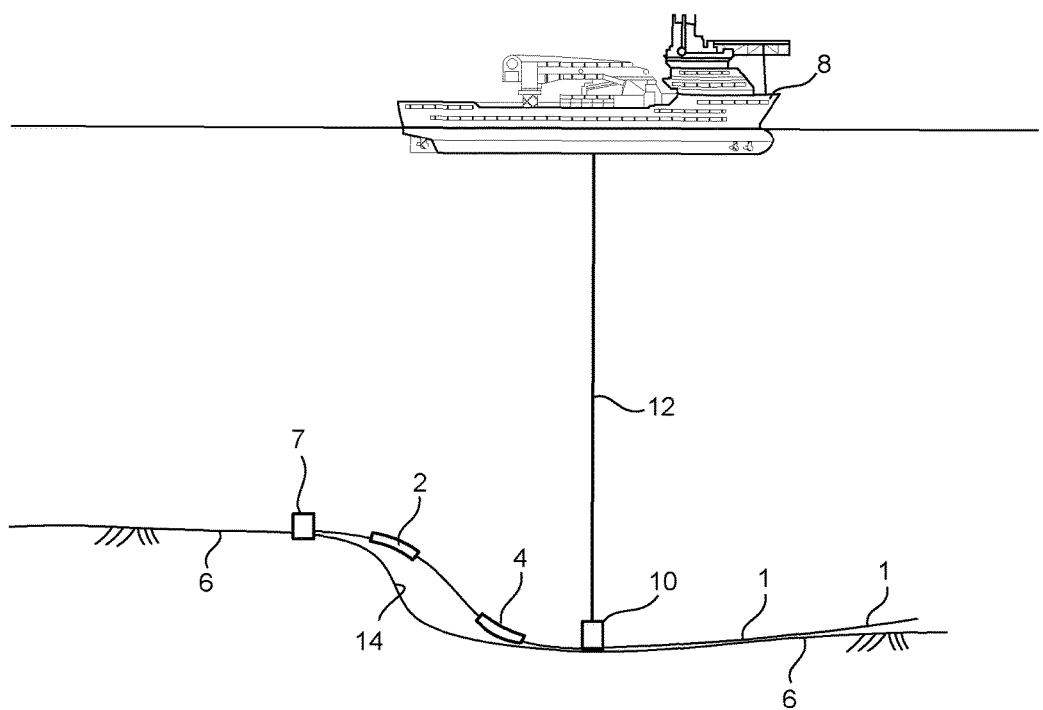
FIG. 1 is a diagrammatic illustration of a process for bending a pipeline of the Prior Art.
Figure 2:
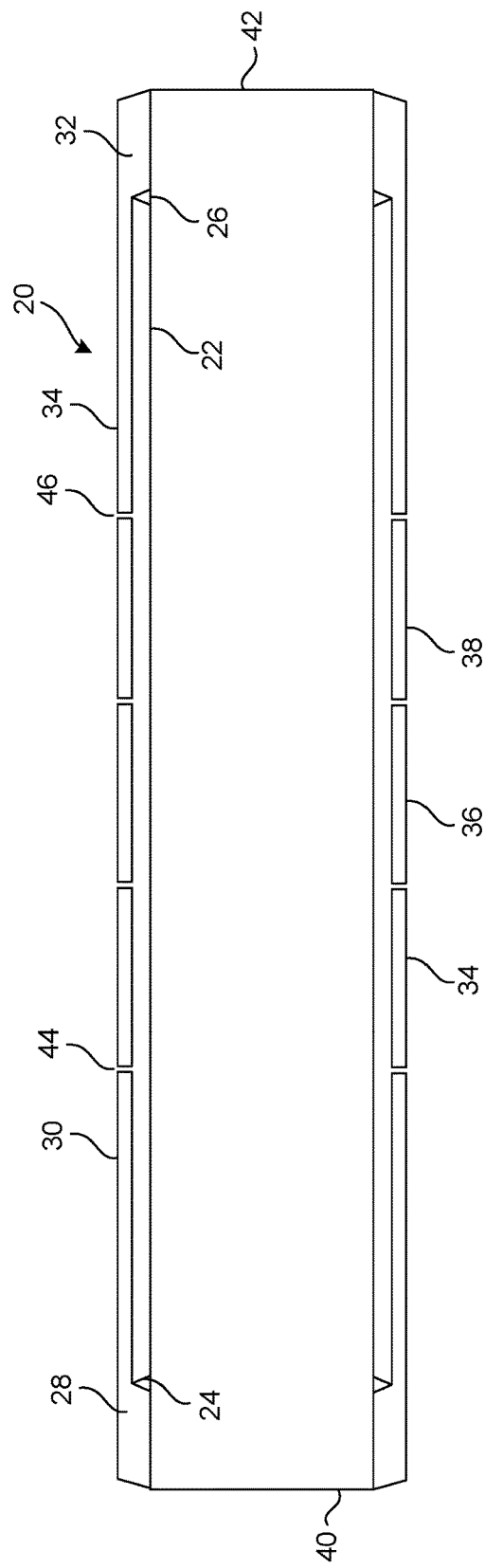
FIG. 2 is a cross-sectional view of a simple embodiment of the bending restrictor assembly of the present invention.

Referring to FIG. 2, there is shown the bending restrictor assembly 20 in accordance with a simplified form of the present invention. The bending restrictor assembly 20 includes a pipeline section 22 that has an outer diameter, a first end 24 and a second end 26. A first overlying pipe section 28 has a wall 30 that overlies a portion of the pipeline section 22 at the first end 24. The first overlying pipe section 28 has an outer diameter greater than the outer diameter of the pipeline section 22. A second overlying pipe section 32 has a wall 34 that overlies another portion of the pipeline section at the second end 26. The second overlying pipe section 32 also has an outer diameter greater than the outer diameter of the pipeline section. A plurality of cylindrical members 34, 36 and 38 overlie the pipeline section 22 and are located between the first overlying pipe section 28 and the second overlying pipe section 32.

The first overlying pipe section 28 has an end 40 that extends outwardly beyond the first end 28 of the pipeline section 22. The second overlying pipe section 32 has an end 42 that extends outwardly beyond the second end 26 of the pipeline section 22. In FIG. 2, it can be seen that the first overlying pipe section 28 has a wall thickness beyond the first end 24 of the pipeline section 22 that is greater than a wall thickness of the wall 30 that overlies the portion of the pipeline section 22. The second overlying pipe section 32 has a wall thickness beyond the second end 26 of the pipeline section 22 that is greater than a wall thickness of the wall 34 that overlies the pipeline section 22. Each of the first overlying pipe section 28 and the second overlying pipe section 32 has an outer diameter that generally matches the outer diameter of the cylindrical members 34, 36 and 38.

The first overlying pipe section 28 has an abutment surface 44 positioned over the pipeline section 22 at the end of wall 30. The second overlying pipe section 32 has an abutment surface 46 that overlies the pipeline section 22 and is located at the end of wall 34. The first cylindrical member 34 is adjacent to the abutment surface 44 of a first overlying pipe section 28. The cylindrical member 38 is adjacent to the abutment surface 46 of the second overlying pipe section 32.

In the present invention, the first overlying pipe section 28 can be shrink-fit over the end 28 of the pipeline section 22. Similarly, the second overlying pipe section 32 can be shrink-fit over the second end 26 of the pipeline section 22. Alternatively, the first overlying pipeline section 28 in the second overlying pipeline section 32 can be simply fit over the respective ends 24 and 26 of the pipeline section 22. In order to achieve liquid tightness, a seam weld would be employed between the ends 24 and 26 of the pipeline section 22 and the respective surfaces of the overlying pipe sections 28 and 30.

In FIG. 2, it can be seen that there is a space between each of the plurality of cylindrical members 34, 36 and 38. This occurs when the pipeline section 22 is straight (as illustrated in FIG. 2). It is the spaces between the cylindrical members 34, 36 and 38 that allows the requisite bend of the pipeline section 22 to be achieved. It should be noted that the illustration of FIG. 2 is illustrative of the arrangement of cylindrical members 34, 36 and 38. A larger number of cylindrical members can also be used in order to achieve the requisite bend and the restriction of olvalization preventing collapse caused by hydrostatic pressure.

Figure 3:
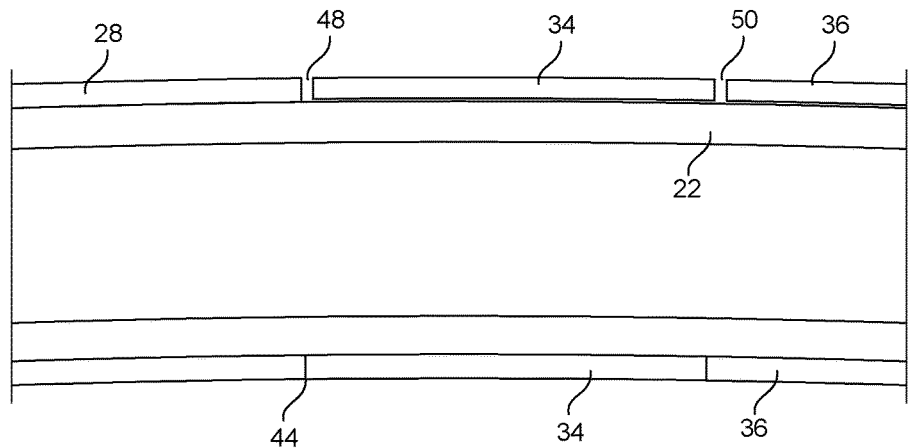
FIG. 3 is a cross-sectional view showing the simplified embodiment of the bending restrictor assembly as configured when the pipeline section is bent.

FIG. 3 shows that the pipeline section 22 has been bent by a small predetermined angle (typically 1°). As can be seen, the cylindrical member 34 is moved such that the cylindrical member 34 abuts the abutment surface 44 of the first overlying pipe section 28. Similarly, the second cylindrical member 36 will abut the opposite side of the cylindrical member 34. This occurs on the compression side of the pipeline section 22 in the direction of the bend. On the opposite tension side of the pipeline section, the first cylindrical member 34 has an increased space 48 between the side of the cylindrical member 34 and the abutment surface 44. Another increased space 50 occurs between the cylindrical member 34 and the cylindrical member 36. As can be seen in FIG. 3, the abutment of the cylindrical members 34 and 36 serves to limit the amount of the bend of the pipeline section 22. The spaces 48 and 50 on the other side of the pipeline section 28 allow the bend to occur in tension and limited by connecting tension members.

Importantly, in the present invention, the first and second overlying pipe sections 28 and 30 essentially increase the section module of the pipeline section 22. As such, the pipeline section 22, which is to be bent, it is very strong at the respective ends 24 and 26. Generally, the maximum thickness of the first and second overlying sections 28 and 30 will match the wall thickness of the adjoining pipeline sections. The relatively thin wall thickness of the pipeline section 22 between the overlying pipe sections 28 and 32 facilitates the locating of a place for a bend to occur. The cylindrical members 34, 36 and 38 effectively enhance the section modulus of the narrow wall thickness area of the pipeline section 22. This serves to restrict any ovalization of the pipeline section 22 during bending. Furthermore, the cylindrical members 34, 36 and 38 serve to resist the hydrostatic pressures that would be exerted on the relatively thin wall pipeline section 22. The arrangement of cylindrical members 34, 36 and 38 effectively can set the desired bend of the pipeline section 22 and so that the pipeline section 22 exceeds its elastic limit in order to achieve a permanent bend while, at the same time, limiting the amount of the bend. The size, arrangement, number and spacing of the cylindrical members can be predetermined in order to achieve the desired bend.

Figure 4:
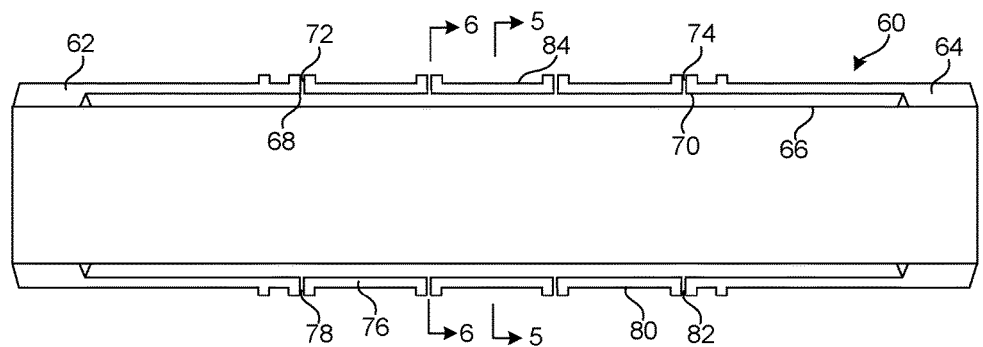
FIG. 4 is a cross-sectional view showing another embodiment of the bending restrictor assembly of the present invention.

FIG. 4 shows an alternative embodiment of the bending restrictor assembly 60 of the present invention. The bending restrictor assembly 60, like the previous bending restrictor assembly 20, includes a first overlying pipe section 62 and a second overlying pipe section 64. These overlying pipe section 62 and 64 overlie the pipeline section 66. The first overlying pipe section 62 has an abutment surface 68 overlying the pipeline section 66. Similarly, there is an abutment surface 70 at the end of the second overlying pipe section 64 that overlies the pipeline section 66. The first overlying pipe section 62 also has a first flange 72 extending radially outwardly therefrom adjacent to the abutment surface 68. The second overlying pipe section 64 has another flange 74 extending radially outwardly therefrom adjacent the abutment surface 70. The first cylindrical member 76 has a flange 78 at one end thereof adjacent to the flange 72 of the first overlying pipe section 62. Another cylindrical member 80 has a flange 82 at an end thereof adjacent to the flange 74 of the second overlying pipe section 64. Another cylindrical member 84 is illustrated as positioned between cylindrical members 76 and 80. Cylindrical member 84 will also have flanges that are adjacent to respective flanges of the cylindrical members 76 and 80. As will be described hereinafter, the various flanges associated with the first overlying pipe section 62, the second overlying pipe section 64 and the cylindrical members 76, 80 and 84 allow tension members to be affixed thereto and therebetween. These tension members will control the amount of bend or spacing between the respective cylindrical members and the respective overlying pipe sections.

Figure 5:
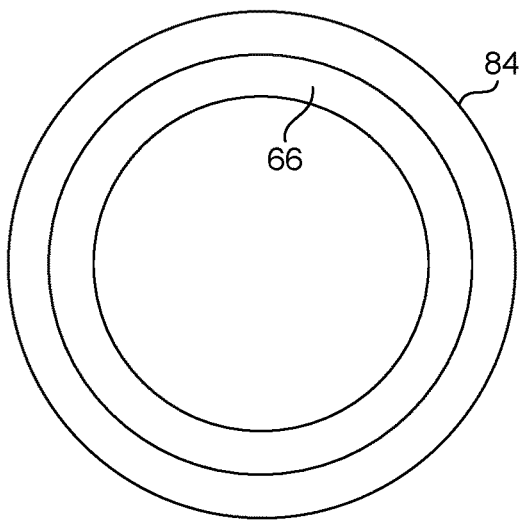
FIG. 5 is a cross-sectional view of the bending restrictor assembly as taken along lines 5-5 of FIG. 4.

FIG. 5 is a cross-sectional view showing the configuration of the cylindrical member 84 and how it is positioned and overlies the pipeline section 66.

Figure 6:
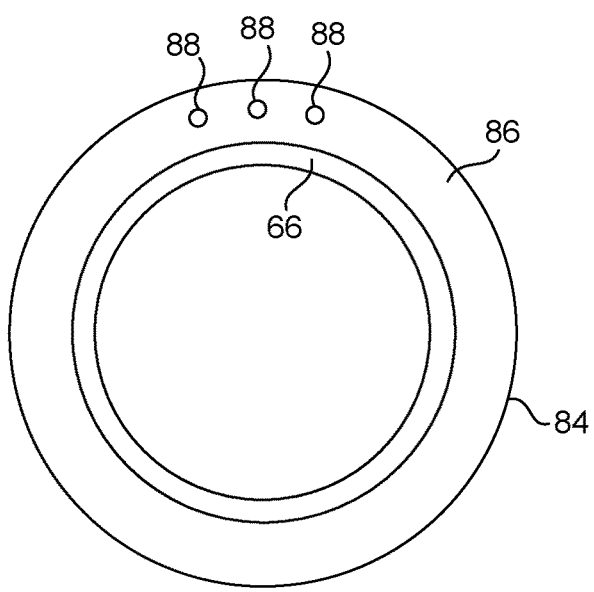
FIG. 6 is a cross-sectional view of the bending restrictor assembly of the present invention is taken across lines 6-6 of FIG. 4.

FIG. 6 shows the configuration of the flange 86 associated with the cylindrical member 84. It can be seen that the flange 86 has holes 88 formed therethrough. Holes 88 are adapted to receive the tension member, as will be described hereinafter. The holes 88 can be of lesser number or greater number depending on the desired degree of bend. The pipeline section 66 is illustrated as extending through the interior of the flange portion of the cylindrical member 84.

Figure 7:
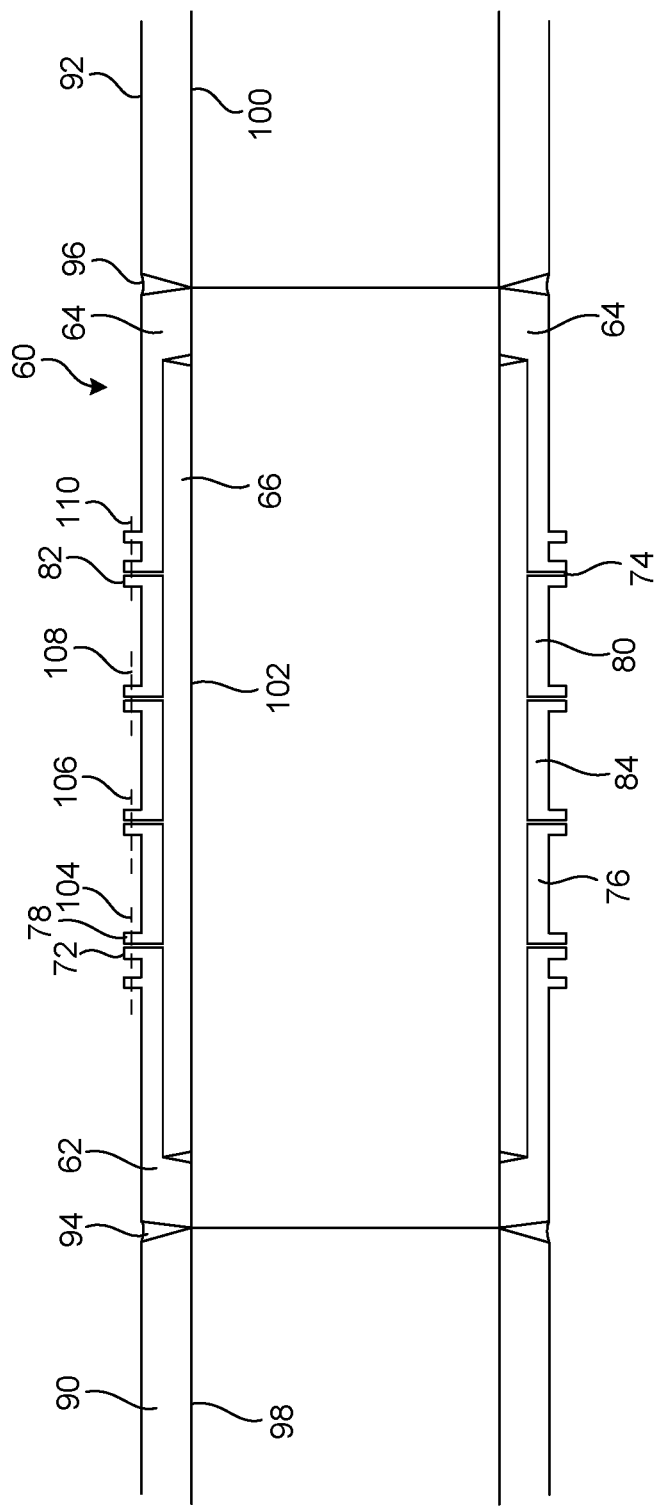
FIG. 7 is a cross-sectional view of the bending restrictor assembly of the present invention as joined to adjacent pipeline sections.

FIG. 7 illustrates how the bending restrictor assembly 60 can be joined to first pipeline section 90 and to a second pipeline section 92. In particular, pipeline section 90 is connected by weld 94 to the end of the first overlying pipe section 62. Similarly, the second pipeline section 92 is connected by weld 96 to the end of the second overlying pipe section 64. The first pipeline section 90 has an inner diameter 98. The second pipeline section 92 has an inner diameter 100. The inner diameter of the pipeline sections 90 and 92 will match the inner diameter 102 of the pipeline section 66. Similarly, the outer diameters of the pipeline sections 90 and 92 will match the outer diameter of the first and second overlying pipe sections 62 and 64.

In FIG. 7, it can be seen that there is a first tension member (illustrated diagrammatically) 104 that connects the flange 72 of the first overlying pipe section 62 with a flange 78 of the cylindrical member 76. Another tension member 106 will connect a flange of the cylindrical member 76 with a flange of the cylindrical member 84. Another tension member 108 connects an opposite flange of the cylindrical member 84 with a flange of the cylindrical member 80. Finally, another tension member 110 is shown as connecting the flange 82 of the cylindrical member 80 with the flange 74 of the second overlying pipe section 64.

It should be noted that the term "tension member" can refer to a variety of configurations. These configurations are described, in greater detail, in U.S. Pat. No. 8,562,255 of the present inventor and parent U.S. application Ser. No. 14/824,630 of the present inventor. In particular, the tension members can be in the nature of bolts, clamps, or slots and pins. As such, the tension members can take on a wide variety of configurations. The tension members serve to limit an amount of space that will occur between the respective cylindrical members 76, 80 and 84 on the tension side of the pipeline section 66 away from the bend.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A bending restrictor assembly for permanently bending and restraining ovality of a subsea pipe, the bending restrictor assembly comprising:
   a pipeline section having an outer diameter, a first end and a second end;
   a first overlying pipe section having a wall overlying a portion of said pipe section at the first end, said first overlying pipe section having an outer diameter greater than the outer diameter of said pipeline section;
   a second overlying pipe section having a wall overlying another portion of said pipeline section at the second end, said second overlying pipe section having an outer diameter greater than the outer diameter of said pipeline section; and
   a plurality of cylindrical members overlying said pipeline section between said first and second overlying pipe sections, said plurality of cylindrical members being translatable along said pipeline section as said pipeline section is bent so as to allow said pipeline section to bend beyond an elastic limit of said pipeline section so as to achieve a permanent bend of said pipeline section.

2. The bending restrictor assembly of claim 1, said first overlying pipe section having an end extending outwardly beyond the first end of said pipeline section, said second overlying pipeline section having an end extending outwardly beyond the second end of said pipeline section.

3. The bending restrictor assembly of claim 2, said first overlying pipe section having a wall thickness beyond the first end of said pipeline section that is greater than a wall thickness of the wall that overlies the portion of said pipeline section, said second overlying pipe section having a wall thickness beyond the second end of said pipeline section that is greater than a wall thickness of the wall that overlies the another portion of said pipeline section.

4. The bending restrictor assembly of claim 1, each of said first and second overlying pipe sections having an outer diameter that matches an outer diameter of said plurality of cylindrical members.

5. The bending restrictor assembly of claim 1, said first overlying pipe section having an abutment surface over said pipeline section, said second overlying pipe section having another abutment surface over said pipeline section, said plurality of cylindrical members positioned between the abutment surfaces.

6. The bending restrictor assembly of claim 5, said first overlying pipe section having a flange extending radially outwardly therefrom adjacent said abutment surface thereof, said second overlying pipe section having another flange extending radially outwardly therefrom adjacent said another abutment surface.

7. The bending restrictor assembly of claim 6, said plurality of cylindrical members having a first cylindrical member adjacent said abutment surface of said first overlying pipe section, said plurality of cylindrical members having a second cylindrical member adjacent said another abutment surface of said second overlying pipe section.

8. The bending restrictor assembly of claim 7, said first cylindrical member having a flange at an end thereof adjacent said flange of said first overlying pipe section, said second cylindrical member having another flange at an end thereof adjacent said another flange of said second overlying pipe section.

9. The bending restrictor assembly of claim 8, said flange of said first cylindrical member being joined to said flange of said first overlying pipe section with a first tension member, said another flange of said second cylindrical member being joined to said flange of said second overlying pipe section with a second tension member, each of said first and second tension members limiting an amount of separation between the cylindrical member and the overlying pipe section.

10. The bending restrictor assembly of claim 1, said first and second overlying pipe sections being in liquid-tight relation with said pipeline section.

11. The bending restrictor assembly of claim 1, said plurality of cylindrical members having a space therebetween when said pipeline section is straight, said plurality of cylindrical members having a portion of abutting each other when said pipeline section is bent.

12. The bending restrictor assembly of claim 1, said plurality of cylindrical members having a tension member between adjacent cylindrical members, said tension member limiting amount of space between the adjacent cylindrical members when said pipeline section is bent.

13. The bending restrictor assembly of claim 12, each cylindrical member of said plurality of cylindrical members having a first flange at one end thereof and a second flange at an opposite end thereof, said tension member being affixed to said first and second flanges.

14. The bending restrictor assembly of claim 1, each of said first and second overlying pipe sections having a maximum wall thickness that is greater than a wall thickness of a wall of said pipeline section.

15. The bending restrictor assembly of claim 1, further comprising:
   a first pipeline affixed to an end of said first overlying pipe section that extends outwardly of said pipeline section; and
   a second pipeline affixed to an end of said second overlying pipe section that extends outwardly of said pipeline section.

16. The bending restrictor assembly of claim 15, said first pipeline having a wall thickness matching a wall thickness of said first overlying pipe section at the end of said first overlying pipe section that extends outwardly of said pipeline section, said second pipeline having a wall thickness matching a wall thickness of said second overlying pipe section at the end of said second overlying pipe section that extends outwardly of said pipeline section.

17. A bending restrictor assembly for permanently bending and restraining ovality of a subsea pipe, the bending restrictor assembly comprising:
   a pipeline section having an outer diameter, a first end and a second end;
   a first overlying pipe section having a wall overlying a portion of said pipe section at the first end, said first overlying pipe section having an outer diameter greater than the outer diameter of said pipeline section;
   a second overlying pipe section having a wall overlying another portion of said pipeline section at the second end, said second overlying pipe section having an outer diameter greater than the outer diameter of said pipeline section; and
   a plurality of cylindrical members overlying said pipeline section between said first and second overlying pipe sections, said first overlying pipe section being shrink-fit onto said pipeline section such that an inner wall of said first overlying pipe section bears against the outer diameter of said pipeline section, said second overlying pipe section being shrink-fit onto said pipeline section such that an inner wall of said second overlying pipe section bears against the outer diameter of said pipeline section.

18. A bending restrictor assembly comprising:
   a pipeline section having a first end and a second end;
   a first overlying pipe section having a wall overlying a portion of said pipeline section at the first end thereof, said first overlying pipe section extending outwardly beyond said first end of said pipeline section, said first overlying pipe section having a maximum wall thickness that is greater than a wall thickness of said pipeline section;
   a second overlying pipe section having a wall overlying another portion of said pipeline section at the second end thereof, said second overlying pipe section extending outwardly beyond the second end of said pipeline section, said second overlying pipe section having a maximum wall thickness that is greater than a wall thickness of said pipeline section; and
   a plurality of cylindrical members overlying said pipeline section between the first and second overlying pipe sections, said plurality of cylindrical members allowing said pipeline section to bend beyond an elastic limit and to restrain ovality of said pipeline section so as to achieve a permanent bend and to prevent collapse of said pipeline section.

* * * * *